United States Patent Office 3,507,028
Patented Apr. 21, 1970

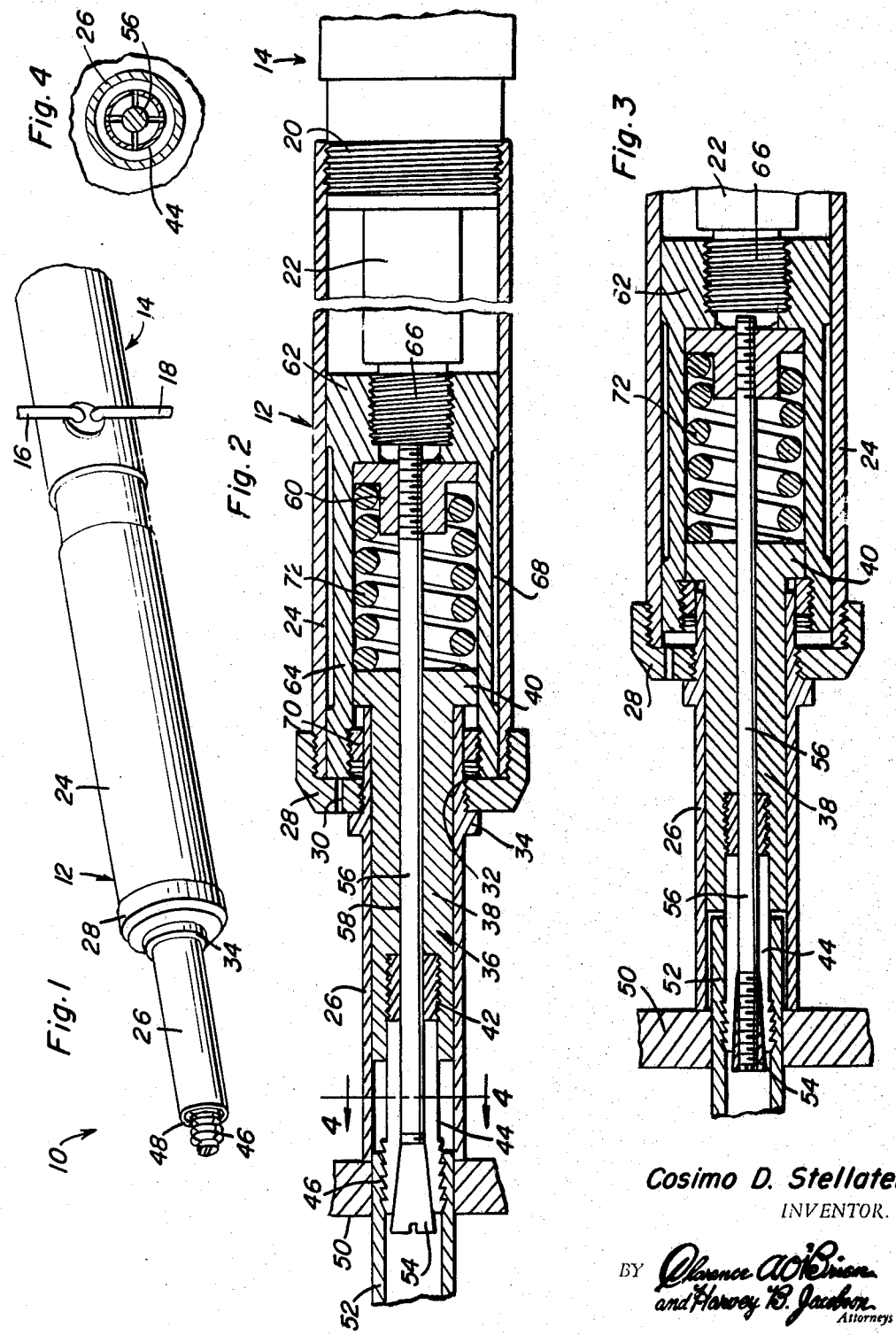
Cosimo D. Stellatella
INVENTOR.

3,507,028
HYDRAULIC TUBE PULLER
Cosimo D. Stellatella, Lyndhurst, N.J., assignor to Nooter Corporation, St. Louis, Mo., a corporation of Missouri
Filed July 13, 1967, Ser. No. 653,190
Int. Cl. B23p 15/26, 19/04
U.S. Cl. 29—202                    10 Claims

ABSTRACT OF THE DISCLOSURE

A device for extracting tubes from the tube sheet of a heat exchanger by radially expanding the serrated end portion of a tubular gripping member inserted into one end of a tube. A conical wedge element expands the gripping member which is urged into contact with the wedge element by a spring to permit contraction of the gripping member when being inserted into the tube before the housing from which it projects abuts the tube sheet. Activation of a piston device operates the wedge element to draw the tube from the tube sheet into the housing.

---

This invention relates to a fluid operated tube puller for extracting tubes from the tube sheet of heat exchangers.

Hydraulically operated tube pullers are well known and generally include a tubular housing placed in abutment with a tube sheet so that a gripping member projecting therefrom will be received within the tube to be extracted. The gripping member is radially expanded into engagement with the internal surface of the tube which is then drawn out of the tube sheet by means of a hydraulically operated wedging element.

In most cases, adjustment is required prior to insertion of the tube gripping member into the tube because of variations in tube diameters. A considerable amount of time is lost thereby particularly where there are a large number of tubes to be extracted. Thus, the present invention is addressed to the problem of providing an improved type of tube puller which will require less adjustment.

In accordance with the present invention, a tube puller is provided having an elongated tubular extracting member continuously urged axially outwardly of the tubular housing associated with the device. The gripping end portion of the extracting member is thereby yieldably held in contact with the wedging element, both of which project from the tubular housing for insertion into the tubes of different internal diameters. Activation of the hydraulically operated piston device will also inwardly draw the wedging element prior to movement of the extracting member to insure firm gripping of the tube before it is drawn inwardly into the housing. Upon completion of an operating stroke of the wedge element, and return of the wedge element to its release position, the spring urging the extracting member outwardly automatically resets the extracting member so that the tube puller may be ready for the next operational stroke.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view showing the tube pulling device of the present invention.

FIGURE 2 is a longitudinal sectional view through the tube puller shown in a working position at the beginning of an operating cycle.

FIGURE 3 is a partial longitudinal sectional view through the tube puller in another operational phase.

FIGURE 4 is a transverse sectional view taken substantially through a plane indicated by section line 4—4 in FIGURE 2.

Referring now to the drawings in detail, it will be observed that the tube puller generally denoted by reference numeral 10, includes an outer tubular housing generally referred to by reference numeral 12 connected to a fluid cylinder device 14 to which fluid under pressure is supplied by the conduits 16 and 18 as shown in FIGURE 1. Any suitable fluid operated cylinder device is utilized, the details of which form no part of the present invention. One end of the cylinder device is however connected by the externally threaded fitting 20 to an internally threaded end portion of the tubular housing 12 as shown in FIGURE 2. Thus, the piston rod 22 projects from the cylinder device 14 into the tubular housing 12 and is connected to the operating parts of the tube puller in order to execute an operational stroke as will be explained hereafter.

The tubular housing 12 includes a diametrically large body section 24 and a diametrically smaller tubular abutment section 26 interconnected by a cap 28 provided with an air vent passage 30. The axial end of the body section 24 is therefore externally threaded for threadedly receiving the cap 28 which in turn is provided with an internally threaded opening for threadedly receiving a tubular extension 32 of the abutment section 26 constituting a limit stop. The abutment section 26 is provided with a flange portion 34 abutting the cap 28 for holding the sections of the tubular housing in assembled relation.

The tubular abutment section 26 of the housing slidably mounts an actuating member 36 which includes a body portion 38 having a flange 40 within the body section 24 opposite the end 41 axially spaced from the abutting end 48 of the section 26. An internally threaded socket 42 is formed within the end 41 of the body portion for threadedly receiving a split sleeve 44 of smaller diameter having an externally serrated end gripping portion 46 which projects from the end 48 of the housing section 26. Thus, the housing section is adapted to be held in abutment with a tube sheet 50 as shown in FIGURE 2 so that the end portion 46 of the extracting member 36 may be received within the tube 52 which is to be drawn into the section 26 of the housing.

Also projecting from the tube gripping end portion 46 of the extracting member, is a conical wedge element 54 adapted to be threadedly mounted on the end of a wedge rod 56 that extends through a bore 58 formed in the body portion 38 of the extracting member. The end of the rod 56 opposite the wedge element 54, is threadedly connected to a spring retainer 60 that is welded to the internally threaded end portion 62 of an actuating sleeve 64. Thus, the wedge rod 56 and actuating sleeve 64 are secured to the threaded end 66 of the piston rod 22.

At one end of its stroke, as shown in FIGURE 2, the piston rod holds the actuating sleeve 64 in abutment with the cap 28, the actuating sleeve being slidably mounted within the body section 24 of the housing and being provided with longitudinal grooves 68 for reducing friction between the slide bearing surfaces. Also, the end of the actuating sleeve adjacent the cap 28 is internally threaded for mounting an annular actuating collar 70 which is also slidingly guided by the limit stop extension 32. Thus, when the cylinder device 14 is activated, the piston rod 22 will axially displace the actuating sleeve and collar 70 into engagement with the flange 40 of the extracting member 36 for inward axial movement thereof away from the end of the stop extension 32.

The actuating sleeve 64 encloses therewithin an axially compressed coil spring member 72 which is disposed about the wedge rod 56 and axially reacts against the flange 40 of the extracting member 36 and the spring retainer 60 connected to the piston rod 22. Thus, the coil spring member 72 continuously urges the extracting member axially outwardly of the housing into engagement with the stop extension 32 as shown in FIGURE 2. The gripping end portion 46 of the extracting member is thereby held in engagement with the conical wedge element 54 so as to properly position the same for insertion into the tube 52.

As the tube puller is inserted into the tube 52, the extracting member is pushed inwardly into the housing 12 against the bias of spring 72 so as to permit contraction of the sleeve 44 as it is axially displaced relative to the wedge element 54. No adjustment for tubes of different internal diameters is therefore necessary, with limits. Once inserted, the gripping end portion 46 will be held in engagement with the tube 52 under the bias of loaded spring 72. When the piston device is activated, force is directly transmitted to the wedge element before any force is transmitted through collar 70 to the extracting member in order to insure that the extracting member is in firm engagement with the tube 52. Thus expansion of the gripping end portion occurs prior to any engagement of the actuating collar 70 with the flange 40 of the extracting member under the continuous urge of the loaded coil spring 72 until no further expansion is possible. Once the extracting member is firmly engaged with the tube 52, it will be withdrawn into the housing as shown in FIGURE 3. After the piston completes its inward stroke, it returns to its original position as shown in FIGURE 2. The extracting member follows the return movement of the wedge element 54 under the urge of the coil spring member 72 so that the device will be ready for the next operational stroke.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In a device for pulling a tube from a tube sheet, having a tubular housing adapted to abut the tube sheet, an expansible extracting member slidably mounted in the housing and projecting therefrom for insertion into the tube, a wedge element projecting from the extracting member and a power operated piston device connected to the wedge element within the housing for externally expanding the extracting member, the improvement comprising stop means fixedly mounted internally of the housing for limiting outward axial movement of the extracting member relative to the housing, while permitting additional outward axial movement of the wedge element and the actuating means, actuating means connected to the piston device and engageable with the extracting member for axial displacement thereof inwardly of the housing, and spring means mounted by the actuating means continuously biasing the extracting member outwardly toward engagement with the stop means for yieldably holding the extracting member in contact with the wedge element, said actuating means being outwardly axially movable in concert with and independently of said extracting member, said independent movement ocurring when said extracting member engages said stop means.

2. The combination of claim 1 wherein said tubular housing includes a small diameter abutment section slidably mounting the extracting member and a large diameter body section enclosing the piston device, said stop means comprising an extension of the abutment section projecting axially into the body section.

3. The combination of claim 2 wherein said extracting member includes a tubular body having a flange connected to one axial end thereof engageable on opposite axial sides with the stop means and the spring means within the body section of the housing, and a split sleeve connected to the other axial end of the tubular body having a tube gripping end portion from which the wedge element projects.

4. The combination of claim 3 wherein said actuating means comprises an elongated sleeve connected to the piston device in enclosing relation to the spring means, and an actuating collar internally mounted in said sleeve axially spaced from the piston device and in sliding relation on the stop means.

5. The combination of claim 4 wherein said wedge element includes a rod connected at one end to the piston device extending through the extracting member and a conical member mounted on the opposite end of the rod in contact with the tube gripping portion of the actuating member, said spring means comprising a coil spring member disposed on the rod reacting between the piston device and the flange of the extracting member.

6. The combination of claim 1 wherein said extracting member includes a tubular body having a flange connected to one axial end thereof engageable on opposite axial sides with the stop means and the spring means within the body section of the housing, and a split sleeve connected to the other axial end of the tubular body having a tube gripping end portion from which the wedge element projects.

7. The combination of claim 6 wherein said wedge element includes a rod connected at one end to the piston device extending through the extracting member and a conical member mounted on the opposite end of the rod in contact with the tube gripping portion of the actuating member, said spring means comprising a coil spring member disposed on the rod reacting between the piston device and the flange of the extracting member.

8. The combination of claim 1 wherein said actuating means comprises an elongated sleeve connected to the piston device in enclosing relation to the spring means, and an actuating collar internally mounted in said sleeve axially spaced from the piston device and in sliding relation on the stop means.

9. The combination of claim 8 wherein said tubular housing includes a small diameter abutment section slidably mounting the extracting member and a large diameter body section enclosing the piston device, and stop means comprising an extension of the abutment section projecting axially into the body section slidably supporting the actuating collar.

10. The combination of claim 1 wherein said wedge element includes a rod connected at one end to the piston device extending through the extracting member and a conical member mounted on the opposite end of the rod in contact with the actuating member, said spring means comprising a coil spring member disposed on the rod reacting between the piston device and the extracting member.

References Cited

UNITED STATES PATENTS

| 1,343,431 | 6/1920 | Canty | 29—280 |
| 1,363,934 | 12/1920 | Upton | 29—280 |
| 3,177,565 | 4/1965 | Martin et al. | 29—202 |
| 3,367,011 | 2/1968 | Sipher | 29—252 X |

THOMAS H. EAGER, Primary Examiner

U.S. Cl. X.R.

29—252, 280